United States Patent
Jalloul et al.

[11] Patent Number: 6,104,747
[45] Date of Patent: Aug. 15, 2000

[54] METHOD FOR DETERMINING OPTIMUM NUMBER OF COMPLEX SAMPLES FOR COHERENT AVERAGING IN A COMMUNICATION SYSTEM

[75] Inventors: Louay Jalloul, Palatine; Nabil Yousef, Arlington Heights, both of Ill.

[73] Assignee: Motorola, Inc., Schaumburg, Ill.

[21] Appl. No.: 09/201,560

[22] Filed: Nov. 30, 1998

[51] Int. Cl.[7] .................................................. H04L 27/30
[52] U.S. Cl. .......................... 375/150; 375/142; 375/148; 375/343
[58] Field of Search ................................. 375/142, 150, 375/355; 708/422, 426; 370/203, 320, 342; 704/216, 217, 218

[56] References Cited

U.S. PATENT DOCUMENTS

| | | | |
|---|---|---|---|
| 5,640,431 | 6/1997 | Bruckert et al. | 375/344 |
| 5,737,327 | 4/1998 | Ling et al. | 370/335 |
| 5,809,064 | 9/1998 | Fenton et al. | 375/150 |
| 5,963,582 | 10/1999 | Stansell, Jr. | 375/148 |

*Primary Examiner*—Stephen Chin
*Assistant Examiner*—Lenny Jiang

[57] ABSTRACT

A method for determining an optimum number (Nopt) of complex samples for coherent averaging of a complex signal S(n) in a code division multiple access communication system includes estimating an initial number (Nint) of complex samples, obtaining fading channel autocorrelation sequence (R(n)) for a plurality (n) of complex samples, the plurality (n) number of complex samples corresponding to the initial number (Nint) of complex samples, computing a constant (K) based on the autocorrelation sequence (R(n)) and the plurality (n) of complex samples, substituting the initial number (Nint) of complex samples for the optimum number (Nopt) of complex samples if the constant (K) is equal or substantially equal to zero.

12 Claims, 7 Drawing Sheets

METHOD FOR DETERMINING OPTIMUM NUMBER OF COMPLEX SAMPLES FOR COHERENT AVERAGING IN A COMMUNICATION SYSTEM

RELATED APPLICATION(S)

This application is related to a commonly assigned application for a patent titled: Method for Determining Fading Correction Factor in a Communication System, filed on Nov. 30, 1998, the same day as the filing date of the present application. The related application is incorporated herein by reference.

FIELD OF THE INVENTION

The present invention relates to communication systems, and more particularly, to code division multiple access communication systems.

BACKGROUND OF THE INVENTION

Coherent and non-coherent averaging functions, two well known functions, are performed on a received signal in a receiver portion of a communication system for many different applications. In particular in a code division multiple access communication system, for example, one or more of the averaging functions are performed on a received signal to mitigate some undesired effects of the received signal distortions due to fading and additive noise plus interference. The results of averaging are used to generate a power-delay profile of the channel through which the received signal has propagated. The power-delay profile is then typically used to estimate time delay and amplitude of the received signal to perform demodulation of the received signal in a Rake receiver in the code division multiple access communication system. Moreover, time delay and amplitude of the received signal are used to determine location of a remote communicating unit. For example, time delay and amplitude of the received signal are used in a method disclosed in the issued U.S. Pat. No. 5,786,791, to Bruckert, assigned to Motorola Inc., assignee of the present invention, and incorporated herein by reference, for determining an angle of arrival of a signal transmitted by a remote communicating unit in a communication system for determining location of the remote communicating unit.

In general, the averaging functions are performed over a limited interval to determine a power-delay profile of the received signal. The phase information is lost in non-coherent averaging as is well known to one ordinary skilled in the art. In contrast, in coherent averaging, the phase information is always preserved. Moreover, advantages of coherent averaging in many different applications in communication systems are well known. As the result of preserving the phase information, more accurate power-delay profile of the received signal than non-coherent averaging at the same signal to noise ratio is produced.

Doppler frequency effects the phase of the received signal among other effects. The Doppler frequency produces phase rotation of the received signal at a proportional rate. Consequently, two samples, namely samples in complex notation, may have 180 degrees phase rotation from each other due to the phase rotation caused by the Doppler frequency. When the complex samples of the received signal have substantial phase differences, the advantage of coherent averaging of the complex samples diminishes which then produces a less accurate power delay-profile of the received signal. If the averaging interval is chosen to be large, as a means to reduce the effect of the Doppler phase rotation, the result of the coherent averaging approaches zero assuming the noise was additive. On the other hand, if the coherent averaging interval is chosen to be small, as a means to reduce the effect of the Doppler phase rotation, the noise variance remains to be large and causes error in the power delay profile of the received signal.

Figure 1:
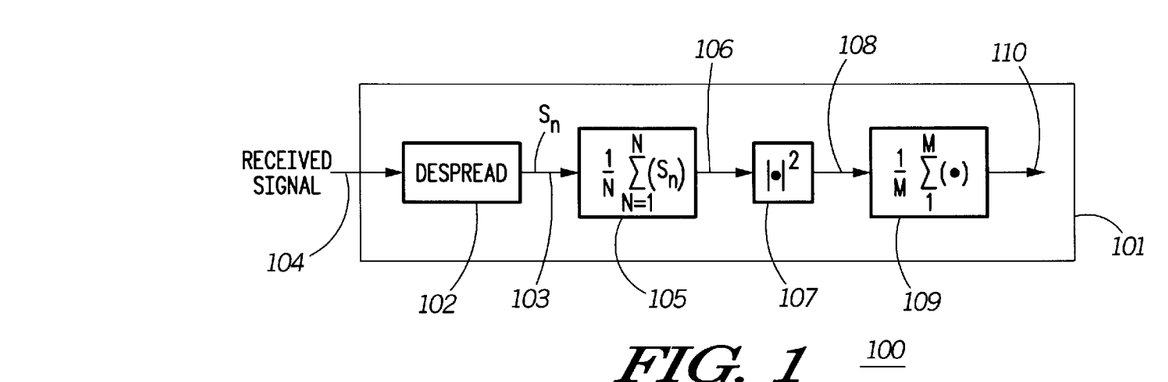
FIG. 1 depicts a block diagram of a power delay generator in a communication stem

Referring to FIG. 1, a block diagram of a power-delay profile generator 100 is shown that may be incorporated in a receiver portion of a code division multiple access (CDMA) communication system. Power-delay profile generator 100 may be incorporated in a searcher element, as commonly referred to by one ordinary skilled in the art, of the receiver portion. Power-delay profile generator 100 receives a code modulated signal 104 at an input of a despreader 102. Code modulated signal 104 has propagated through a channel before arriving at power-delay profile generator 100. Despreader 102 despreads code modulated signal 104 using a locally generated replica of the spreading code to produce complex samples 103 of code modulated signal 104. The operation of despreader 104 is well known by one ordinary skilled in the art. The duration of despreading function in despreader 102 may be equal to many times the chip time of the modulating code, e.g. 256 times the chip duration. One chip time, Tc, in a code division multiple access communication system, is equal to duration of one clock time of the code modulating sequence that is used to code modulate received signal 104. For example, in a well known code division multiple access communication system operating according to commonly known IS-95 standard, Tc is equal to 1/1.2288 Mcps which is equal to 0.813 micro seconds. Despreader 102 uses pre-assigned code information, and possibly with the use of a sliding correlator, to generate complex samples 103. Complex samples 103 are input to a coherent averaging block 105. Coherent averaging block 105, after receiving a number (N) of complex samples 103, performs a coherent averaging function over the "N" complex samples 103 to produce a coherently averaged complex sample 106. The coherent averaging may be performed according to the following:

$$1/N \sum_{n=1}^{N} S(n)$$

where "S(n)" is the received complex sample for each complex sample from n=1 to N. One ordinary skilled in the art may appreciate that coherent averaging may be performed according to the following:

$$1/N \sum_{n=1}^{N} S(n)W(n)$$

where "W(n)" is a weighting coefficient for received complex sample S(n) for each complex sample from n=1 to N.

The magnitude of coherently averaged complex sample 106 may be squared in a block 107 to produce a coherently averaged real sample 108. The operation of block 107 may be limited to taking the magnitude of the averaged complex sample 106 to produce averaged real sample 108 as one ordinary skilled in the art may appreciate. Averaged real sample 108 are input to an averaging block 109. Averaging block 109, after receiving a number (M) of averaged real samples 108, performs an averaging function over the number (M) of averaged real samples 108 to produce a power delay sample 110 for generating a power delay profile of the received signal 104. The averaging in block 109 may be according to the following:

$$1/M \sum_{m=1}^{M} Y(m)$$

where "Y(m)" is averaged real samples 108 for m=1 to M. One ordinary skilled in the art may appreciate that the functions performed in blocks 107 and 109 are in essence in combination equal to a non-coherent averaging function.

According to prior art, an optimum number "N" of complex samples "S(n)" may be determined according to the following:

$$N = 1/fD \cdot Ts$$

where fD is the maximum Doppler frequency experienced by code modulated signal 104 received at power-delay profile generator 100. The parameter Ts is the despreading duration in despreader 102. The number (N) of complex samples, when it is based on the maximum Doppler frequency, is least likely to be an optimum number of complex samples for the coherent averaging function in block 105.

Therefore, there is a need to determine an optimum number of complex samples for performing coherent averaging of code modulated complex signals, and a method for correcting errors in the power-delay profile of the received signal 104 due to Doppler frequency shift and fading.

DESCRIPTION OF THE PREFERRED EMBODIMENT(S)

According to various aspects of the invention, determining an optimum number (Nopt) of complex samples for performing coherent averaging of a complex signal S(n) in a code division multiple access communication system includes estimating an initial number (Nint) of complex samples, and obtaining fading channel autocorrelation function (R(n)) for a plurality (n) of complex samples. The number of the plurality (n) of complex samples corresponds to the initial number (Nint) of complex samples. A constant (K) is computed based on the autocorrelation sequence (R(n)) and plurality (n) of complex samples. The initial number (Nint) of complex samples is substituted for the optimum number (Nopt) of complex samples if the constant (K) is equal or substantially equal to zero. In the most preferred embodiment of the invention, the constant K is computed according to:

$$\sum_{n=1}^{N_{int}-1} nR(n) = K.$$

Figure 2:
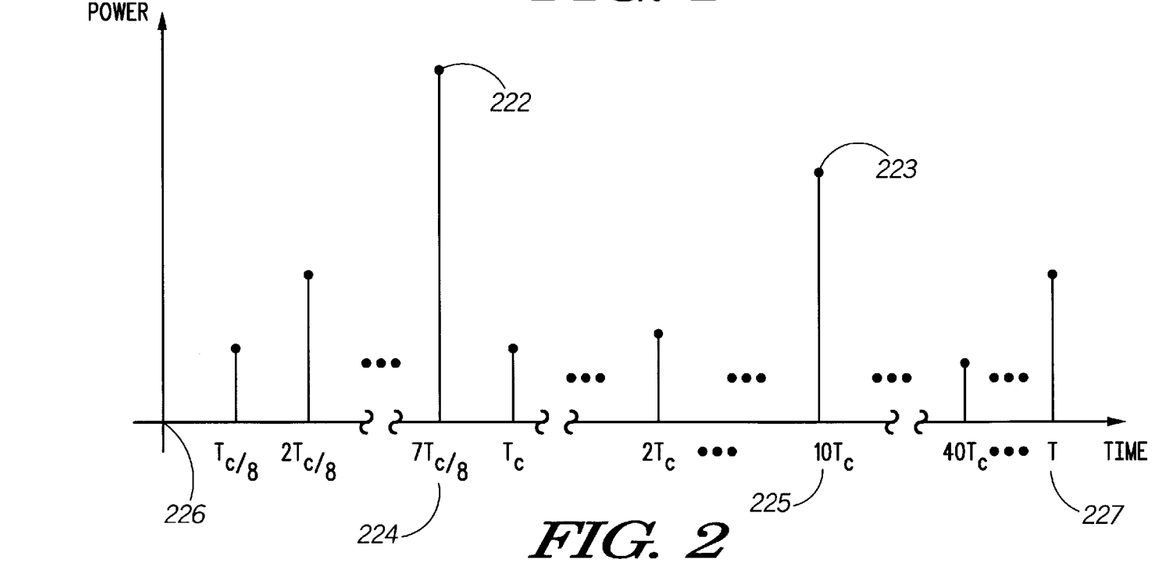
FIG. 2 depicts a power-delay profile of a received signal.

Referring to FIG. 2, a power-delay profile of a possible received signal is shown for a search window (T) 227 in a typical CDMA searcher. For example, signal peaks 222 and 223 are detected at time delay (7 Tc/8) 224 and (10 Tc) 225 with respect to a time reference 226. The received signal at peaks 222 and 223 are time offset by the amount of time delay between time delays (7 Tc/8) 224 and (10 Tc) 225 for a combining operation in a typical demodulator Rake receiver in a CDMA communication system. In case it is desired to determine the location of the remote communicating unit that transmitted the received signal, it is possible to use only the earliest arriving peak, peak 222, and its corresponding time delay (7 Tc/8) 224. Therefore, accurate estimation of each peak and its corresponding time delay are critical for the receiver operation. The invention provides a method for determining an optimum number (Nopt) of complex samples for computing the coherent averaging of the received signal to calculate an accurate estimation of amplitude of the peak and time delay of the received signal.

Figure 3:
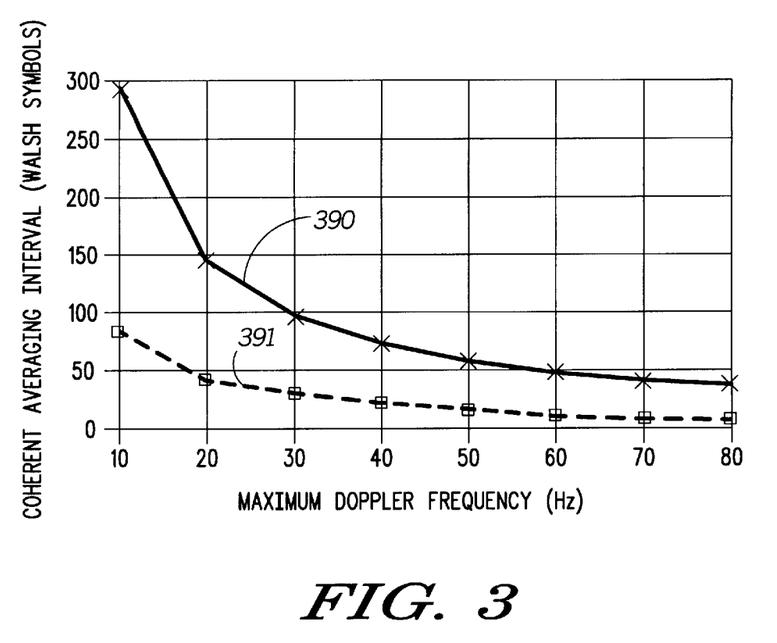
FIG. 3 depicts a graphical representation of optimum number of complex samples verses different Doppler frequencies.

Referring to FIG. 3, an optimum number (Nopt) 390 of complex samples determined according to the invention and a number 391 of complex samples determined according to the prior art, both in terms of Walsh Symbols, are shown graphically at different maximum Doppler frequencies. For example, at the maximum Doppler frequency of 20 Hz, optimum number (Nopt) 390 is equal to 150 Walsh symbols where one Walsh symbol is equal to 256 Tc, and number 391 of complex samples determined according to the prior art is equal to a number less than 50.

Figure 4:
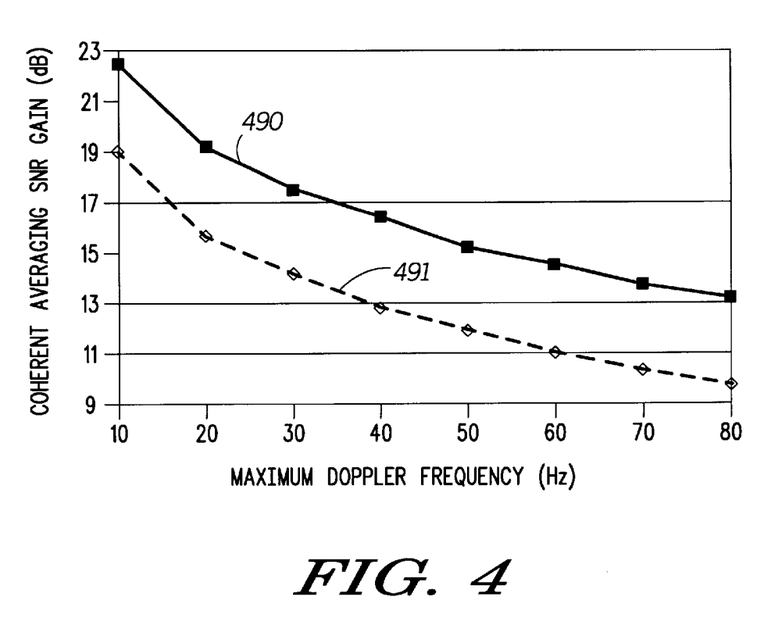
FIG. 4 depicts signal to noise ratio gain of complex samples when determined according to one or more aspects of the invention.

Referring to FIG. 4, one or more advantages of the invention are shown through a graphical representation. The signal to noise ratio (SNR) gain of complex samples 106, shown in FIG. 1, are shown with respect to different Doppler frequencies. The SNR gain of complex samples 106 calculated based on optimum number (Nopt) 390 of complex samples is shown by SNR gain 490, and calculated based on number of complex samples 391 is shown by SNR gain 491. One ordinary skilled in the art may appreciate that SNR gain 490 is at least 3.5 dB higher than SNR gain 491 which is an advantage of the invention.

Figure 5:
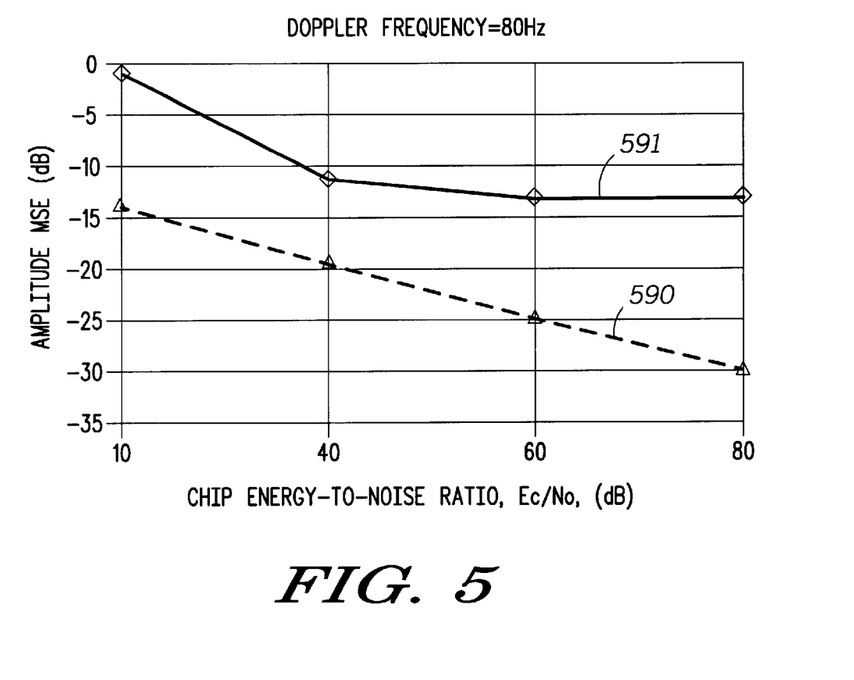
FIG. 5 depicts accuracy of mean square estimate of a power delay profile according to one or more aspects of the invention.
Figure 6:
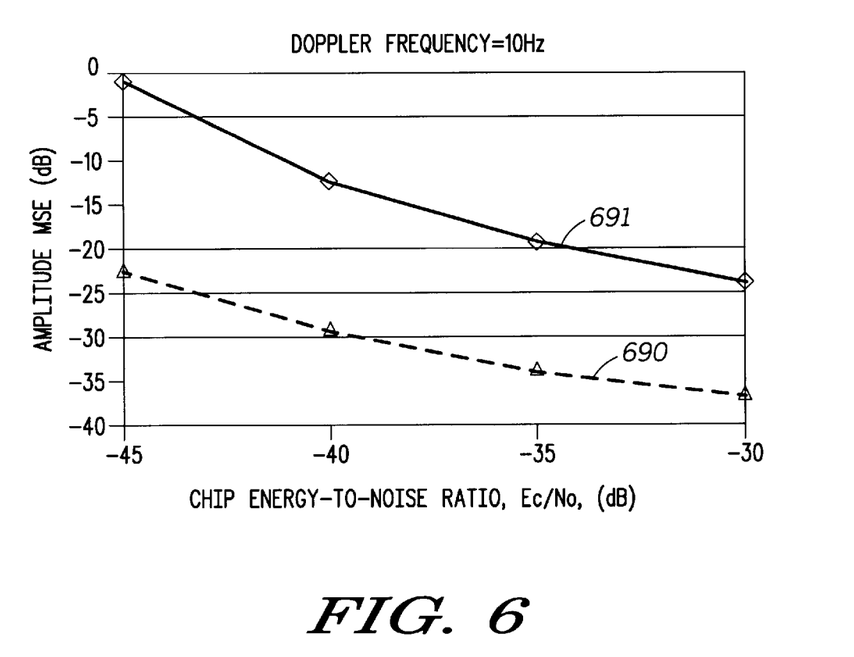
FIG. 6 depicts accuracy of mean square estimate of a power delay profile according to one or more aspects of the invention.

Referring to FIGS. 5 and 6, improvements in accuracy of the mean square estimate (MSE) of the amplitude of power-delay profile of a received signal with 80 and 10 Hz Doppler frequencies are shown respectively. In FIG. 5, MSE 590 is calculated from a power delay-profile generated based on optimum number (Nopt) 390 of complex samples. MSE 591 is calculated from a power delay-profile generated based on number of complex samples 391 determined according to prior art. One ordinary skilled in the art may appreciate that at MSE equal to −20 dB, the required chip energy to noise of the received signal is at about −40 dB according to MSE 590 while MSE 591 does not even reach −20 dB MSE at −30 dB chip energy to noise of the received signal. This is a substantial improvement achieved according to different aspects of the invention. Similarly, in FIG. 6, MSE 690 is calculated from a power delay-profile generated based on optimum number (Nopt) 390 of complex samples. MSE 691 is calculated from a power delay-profile generated based on number of complex samples 391 determined according to prior art. One ordinary skilled in the art may appreciate that the improvement is over 15 dB less requirement of chip energy to noise of the received signal to produce a power-delay profile with MSE amplitude at −20 dB.

Figure 7:
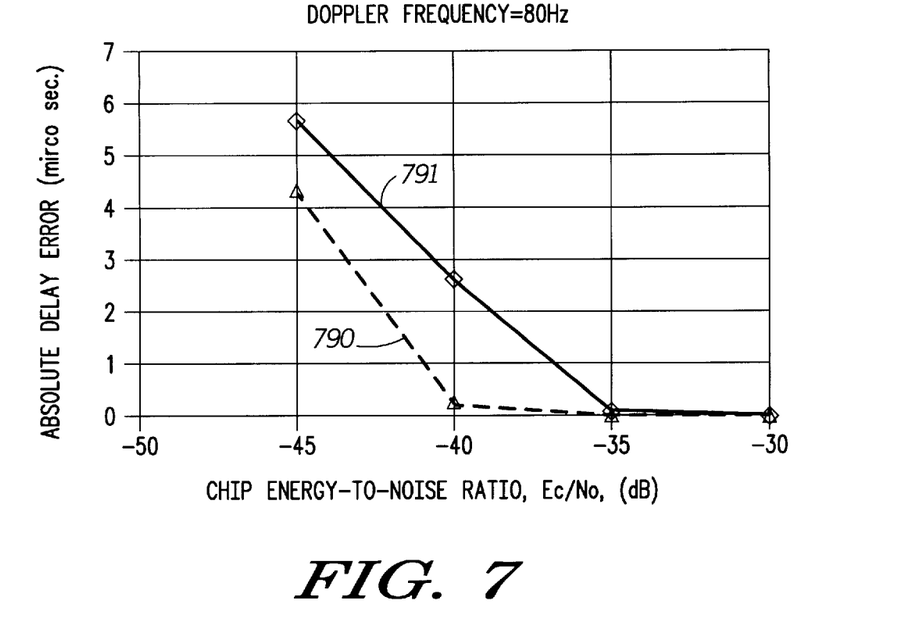
FIG. 7 depicts magnitude of delay error of a power delay profile according to one or more aspects of the invention.
Figure 8:
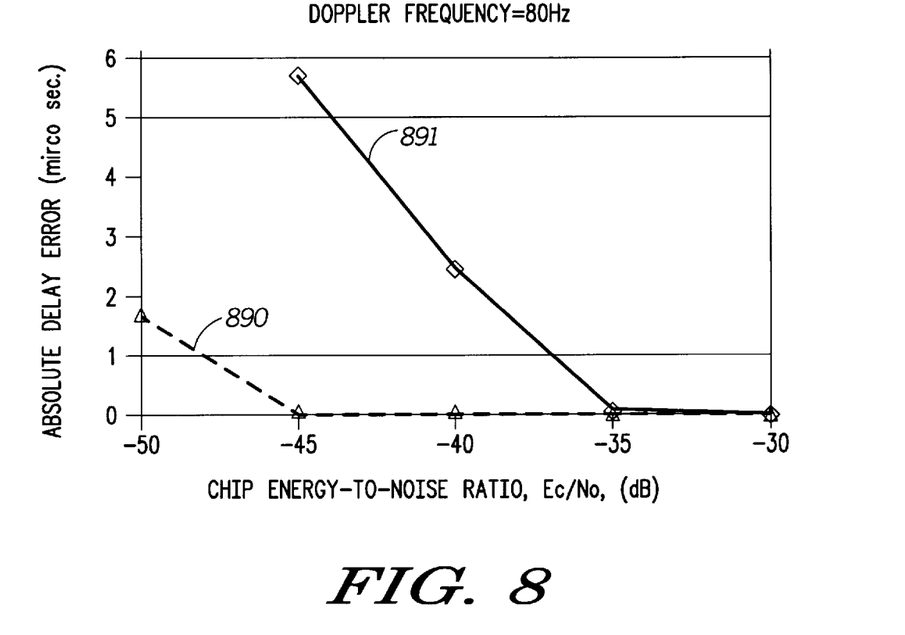
FIG. 8 depicts magnitude of delay error of a power delay profile according to one or more aspects of the invention.

Referring to FIGS. 7 and 8, absolute delay error improvement in power-delay profile of the received signal are shown for 80 and 10 Hz Doppler frequencies. Delay errors 790 is calculated from a power delay-profile generated based on optimum number (Nopt) 390 of complex samples. Delay errors 790 is calculated from a power delay-profile generated based on number of complex samples 391 determined according to prior art. Similarly, in FIG. 8, delay errors 890 is calculated from a power delay-profile generated based on optimum number (Nopt) 390 of complex samples. Delay errors 891 is calculated from a power delay-profile generated based on number of complex samples 391 determined according to prior art. One ordinary skilled in the art may appreciate that delay errors 790 and 890 indicate less delay error than delay errors 791 and 891 respectively. This is an advantage of the present invention. For example at −40 dB chip energy to noise ratio of the received signal, delay errors 890 and 790 calculated according to various aspect of the invention produce almost no delay error in the power delay profile of the received signal. As a result, power delay profile of the received signal is more accurate with respect to time delay and amplitude at low chip energy to noise ratio of the received signal. This leads to less expensive receiver design and improved performance in demodulation and estimation of the transmitting unit location.

The search window depends on the communication system cell coverage area. A remote communicating unit may be at the edge of the coverage area, therefore, the search window (T) 227 is chosen to be slightly more than a maximum propagation time of a signal transmitted from that remote communicating unit to a base station receiving the signal. Search window (T) 227 is normally as large as 20 to 50 chip time, Tc. One chip time, Tc, in a code division multiple access communication system, is equal to duration of one clock time of the code modulating sequence that is used to code modulate received signal 104.

Normally, a sample point of power-delay profile is determined for a fraction of Tc. For example, a sample point of power-delay profile may be determined for every Tc/8. If the search window T is chosen to be equal to 50 times Tc, there would be 400 sample points in the power delay profile. According to one aspect of the present, once an optimum number (Nopt) complex samples is determined for determining a sample point of a power delay profile, the optimum number (Nopt) is used for determining every sample point of power delay profile for duration of search window T.

Despreader 102 produces complex samples 103 of received signal 104 by continuously correlating the received signal with a known code. For example, if the optimum number (Nopt) is determined to be equal to six by computing K equal to or substantially equal to zero according to:

$$\sum_{n=1}^{N_{int}-1} nR(n) = K$$

and M is selected to be equal to four, a total of 24 complex samples 103 would be needed to generate a sample of power-delay profile 110. Computation of autocorrelation sequence R(n) is known by one ordinary skilled in the art. The preferred method is taking Fast Fourier transform and inverse Fast Fourier transform of several complex samples 103. The complex samples used for determining the autocorrelation function may be the complex samples received on previous transmission of signal 104. The autocorrelation sequence of a signal transmitted from a remote source normally does not change rapidly and it is normally a function of location and speed of the transmitting unit. The characterization of the autocorrelation sequence may remain valid unless the remote communicating unit changes its position drastically. Such drastic change in the location and position of a remote unit does not occur very often. Therefore, the autocorrelation sequence for different number of complex samples may be incorporated in a table for quick retrieval during processing of the received signal 104 in producing a sample of power-delay profile 110.

In a CDMA communication system, the mobile and the fixed units communicate through different communication channels. Two types of such channels are commonly referred to as Traffic channel and the Pilot channel. Traffic channel normally carries information generated by the user, and the pilot channel carries information that are known by both sides of the communication link. A receiver that is receiving a signal carrying Traffic channel information normally does not know the content of the information until the received signal is demodulated. On the other hand, the receiver of a signal carrying the pilot channel knows the content of the information. According to the invention, the received signal, if it is carrying Traffic channel with unknown information, should be demodulated of the unknown information before presented as received signal 104 to power-delay generator 101.

Figure 9:
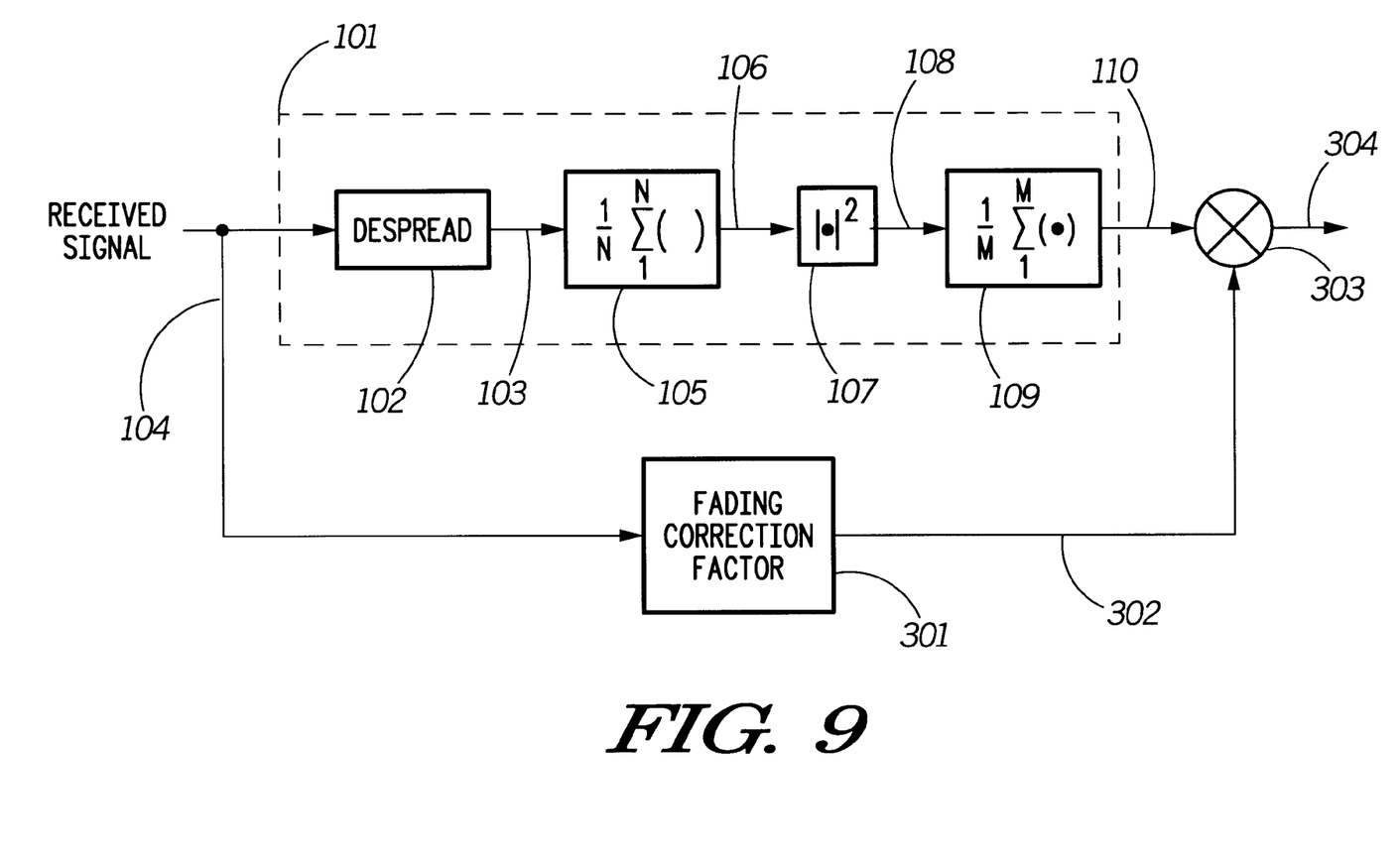
FIG. 9 depicts a block diagram of a power-delay generator incorporating a fading correction factor according to one or more aspects of the invention.

Referring to FIG. 9, to correct for errors produced as the result of the fading channel characteristics, a fading correction factor 302 is determined and used for correcting a sample of power delay profile 110 of received signal 104. Correction factor 302 is associated with a fading channel characteristic through which received signal 104 propagates before being received at power delay profile generator 101. A method according to one or more aspects of the invention includes estimating a number (N) of complex samples, and obtaining fading channel autocorrelation sequence (R(n)) for a plurality (n) of complex samples, plurality (n) of complex samples corresponding to the number (N) of complex samples. Then, computing correction factor 302 according to an equation including (N), (R(n)) and (n). To produce a corrected sample 304 of the power delay profile, sample of the power delay profile 110 of the received signal is scaled at a scaler 303 proportional to correction factor 302.

In further aspect of the invention, the equation is according to:

$$N \cdot \left[ R(0) + \sum_{n=1}^{N-1} 2(N-n)R(n)/N \right]^{-1},$$

wherein (n) is from 0 to N-1.

Estimating the number (N) of complex samples may include estimating an optimum number (Nopt) of complex samples, as described above, and substituting the estimated (Nopt) for (N). A table may be generated that includes different values of fading correction factor 302 for different number (N) of complex samples. The table may be accessed by a processor, for example, for quick retrieval during processing of received signal 104 for producing corrected sample 304 of the power delay profile.

Figure 10:
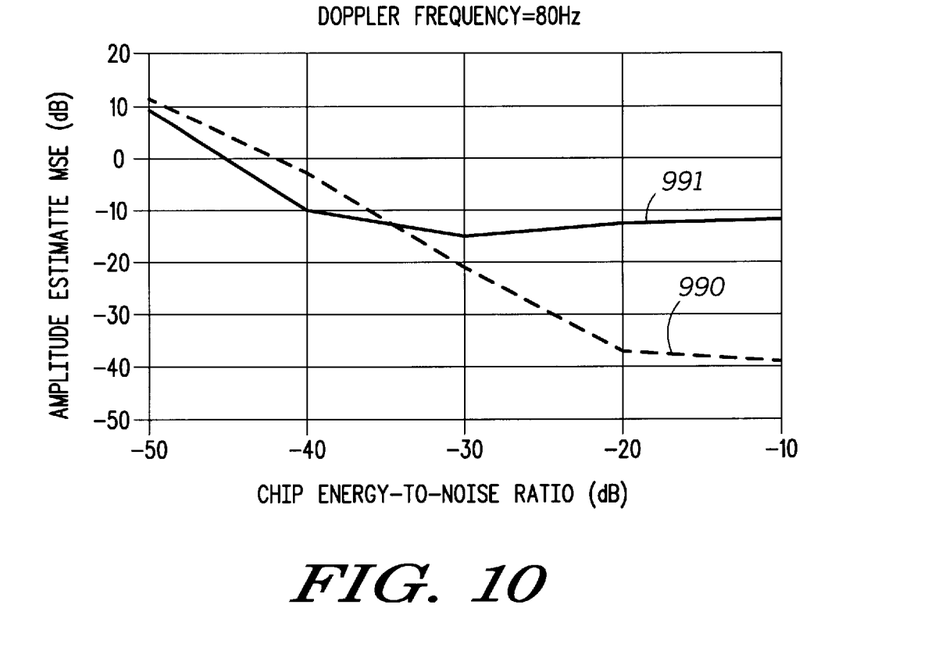
FIG. 10 depicts means square estimate of the power delay profile with and without incorporating a fading correction factor according to one or more aspects of the invention.

Referring to FIG. 10, a plot of MSE 991 generated without any correction according to the prior art, and a plot of MSE 990 generated by taking correction factor 302 are shown for a received signal with 80 Hz Doppler frequency at different chip energy to noise ratio. One ordinary skilled in the art may appreciate the advantages of the invention in producing a power delay profile with about 20 dB better amplitude MSE when the received signal is at about −20 chip energy to noise ratio level as shown in the difference between MSE 991 and 990.

Figure 11:
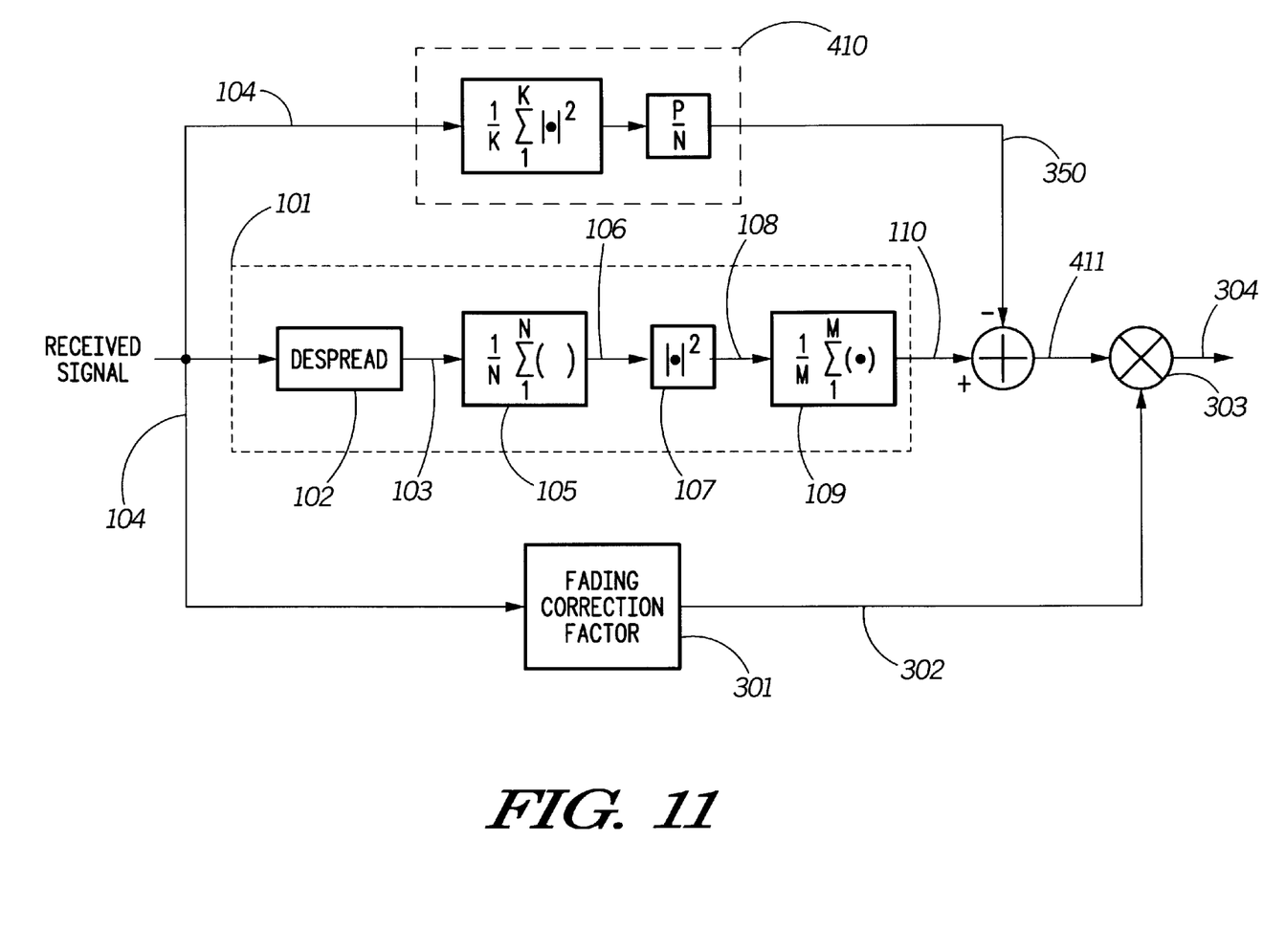
FIG. 11 depicts a block diagram of a power-delay generator incorporating a fading and noise correction factors according to one or more aspects of the invention.

Referring to FIG. 11 The invention may include incorporating other factors such as a noise factor while improving the accuracy of the power delay profile of the received signal. A noise factor 350 based on the received signal is estimated according to the prior arts. Estimation of such a noise factor is well known by one ordinary skilled in the art. In addition to scaling proportional to fading correction factor 302, a sample of power delay profile 110 of the received signal is scaled proportional to noise factor 350 to produce a sample of noise corrected power delay profile 411 of the received signal. Noise factor 350 may be estimated based on the number (N) of complex samples. Sample of power delay profile 411 is then scaled proportional to fading correction factor 302 to produce at least one corrected sample 304 of the power delay profile of the received signal.

Figure 12:
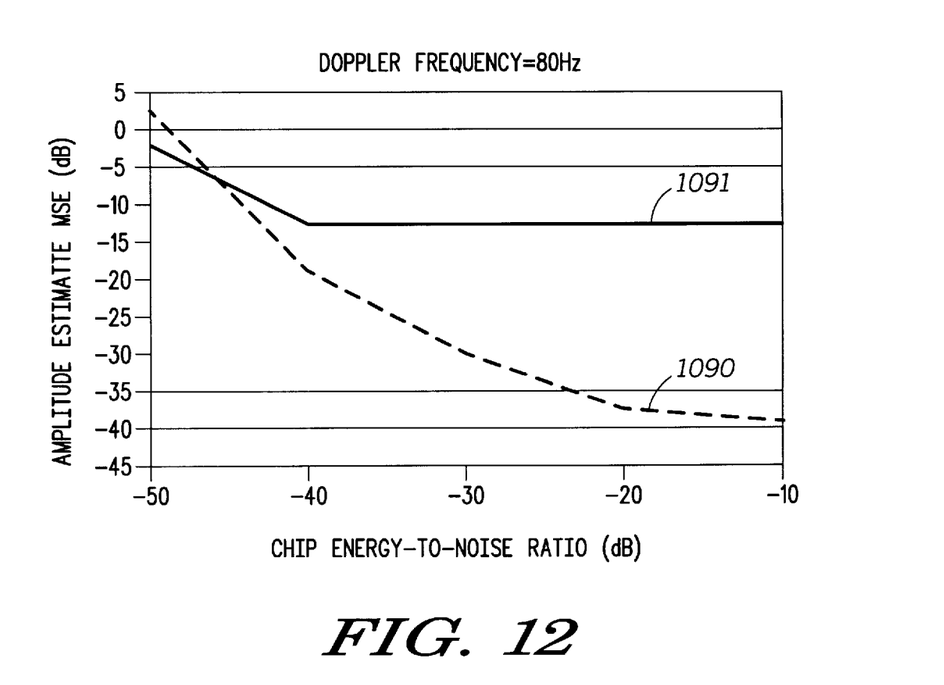
FIG. 12 depicts means square estimate of the power delay profile with and without incorporating a fading correction factor according to one or more aspects of the invention.

Referring to FIG. 12, a plot of MSE 1091 generated by including noise correction factor 350 according to the prior art, and a plot of MSE 1090 generated by including fading correction factor 302 and noise correction factor 350 are shown for a received signal with 80 Hz Doppler frequency at different chip energy to noise ratio. One ordinary skilled in the art may appreciate the advantages of the invention in producing a power delay profile with about 25 dB better amplitude MSE when the received signal is at about −20 chip energy to noise ratio level.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method for determining an optimum number (Nopt) of complex samples for coherent averaging of a complex signal S(n) in a spread spectrum communication system comprising the steps of:

a. estimating an initial number (Nint) of complex samples;

b. obtaining fading channel autocorrelation sequence (R(n)) for a plurality (n) of complex samples, the number of said plurality (n) of complex samples corresponding to said initial number (Nint) of complex samples;

c. computing a constant (K) based on said autocorrelation sequence (R(n)), said initial number (Nint) of complex samples and the number of said plurality (n) of complex samples;

d. substituting said initial number (Nint) of complex samples for said optimum number (Nopt) of complex samples if said constant (K) is equal to zero;

e. performing coherent averaging of the complex signal by a receiver in the spread spectrum system based on the optimum number of complex samples determined in steps "a–d", in order to reduce the effect of Doppler phase rotation and noise variance.

2. The method as recited in claim 1 further comprising the steps of:

repeating steps "a–d" until said constant (K) is computed to be equal to zero in said computing step, wherein each time a different said initial number (Nint) of complex samples is used in said computing step;

substituting a final said initial number (Nint) of complex samples found in said repeating step for said optimum number (Nopt) of complex samples.

3. The method as recited in claim 1 wherein said computing step, said constant (K) is computed according to:

$$\sum_{n=1}^{N_{int}-1} nR(n) = K.$$

4. The method as recited in claim 1 wherein said obtaining fading channel autocorrelation sequence (R(n)) includes finding a maximum Doppler frequency.

5. The method as recited in claim 1 further comprising a step of producing a coherently averaged complex sample based on said optimum number of complex samples.

6. The method as recited in claim 5 further comprising a step of generating said optimum number of complex samples by performing a despreading function over a received signal transmitted from a remote communicating unit, wherein said complex signal S(n) is based on said received signal.

7. The method as recited in claim 6 further comprising a step of collecting sufficient number of said coherently averaged complex samples for producing a sample of a power-delay profile of a channel through which said signal propagated from said remote communicating unit.

8. The method as recited in claim 7 further comprising a step of repeating said producing said sample of a power-delay profile of said channel to generate said power delay profile of said channel.

9. The method as recited in claim 8 wherein said power delay profile is used for demodulating information transmitted from said remote communicating unit.

10. The method as recited in claim 9 wherein said power-delay profile is used for determining location of said remote communicating unit.

11. The method as recited in claim 1 wherein said complex signal s(n) is based on a received signal in said communication system, further comprising a step of demodulating said received signal prior to a step of producing said complex signal S(n).

12. The method as recited in claim 1 wherein said communication system is a code division multiple access communication system.

* * * * *